T. LALY.
Linch-Pin.
No. 44,321
Patented Sept. 20, 1864.
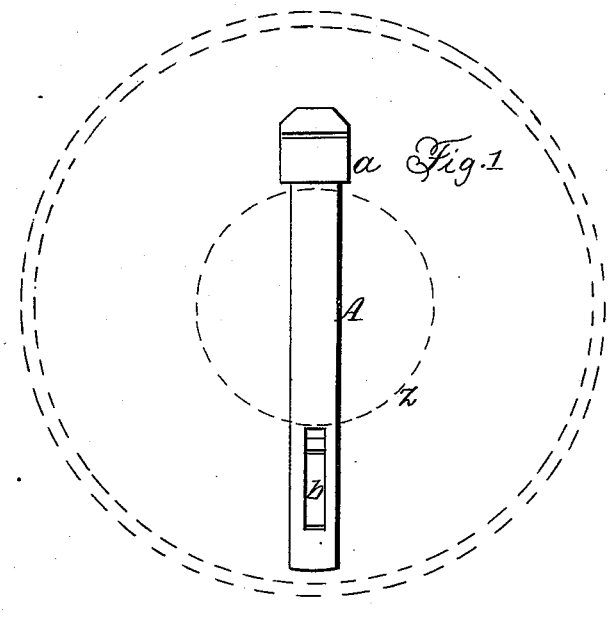
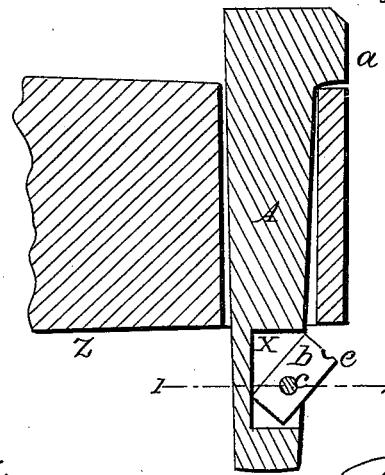
Witnesses.
Charles E. Foster
Charles Howson
Inventor
Henry Howson
Atty for T. Laly

UNITED STATES PATENT OFFICE.

THOMAS LALY, OF PHILADELPHIA, PENNSYLVANIA.

IMPROVEMENT IN LINCHPINS.

Specification forming part of Letters Patent No. 44,321, dated September 20, 1864.

*To all whom it may concern:*

Be it known that I, THOMAS LALY, of Philadelphia, Pennsylvania, have invented an Improvement in Linchpins; and I do hereby declare the following to be a full, clear, and exact description of the same, reference being had to the accompanying drawings, and to the letters of reference marked thereon.

My invention consists of a cheap, simple, and efficient device, fully described hereinafter, for preventing the linchpins of vehicles from being accidentally dislodged from their proper positions in the axles.

In order to enable others to make and apply my invention, I will now proceed to describe its construction and operation.

On reference to the accompanying drawings, which form part of this specification, Figure 1 is a front view of my improved linchpin; Fig. 2, a vertical section, and Fig. 3 a transverse section on the line 1 2, Fig. 1.

A is a linchpin, which has the usual head, $a$, and is similar in form to those generally employed for maintaining the wheels of vehicles in their proper position on their axles. Near the lower end of the pin is a recess, $x$, and in this recess a dog, $b$, is hung to a pin, $c$, which passes through the linchpin and through the said dog at a point below the center of the latter. At one of the upper corners of the dog a lip, $e$, is formed, for a purpose described hereinafter. When the pin has to be applied to the axle, (a portion of which is represented by red lines $z$,) the dog $b$ is turned back within the recess $x$ until its outer edge is flush with the front edge of the pin. The latter is then introduced into the opening in the axle, so that it shall occupy the position shown in the drawings, the recess $x$ being below the lower edge of the axle. Any suitable instrument is then introduced into the recess above the dog in such a manner as to catch the lip $e$ and force out the upper end of the dog, so that a portion of the same shall project beyond the pin, as shown in Fig. 2.

The constant jolting to which vehicles of all kinds are subjected frequently displaces the linchpins, the loss of which is the cause of many and dangerous accidents. This defect has been partially remedied by passing a strip of leather or similar material through an opening in that portion of the pin which projects below the axle. The leather, however, wears away or becomes detached, in which case the pin is liable to be thrown from its place at any moment.

In my improvement, so long as the dog $b$ projects beyond the face of the pin it will effectually prevent its withdrawal or dislodgment. In consequence of the preponderance in weight of that portion of the dog above the pin $c$, there will be no tendency on the part of the dog to fall back within the recess. If desirable, however, a spring may be introduced into the recess, so as to bear against the back of the dog and force outward the upper end of the same. After turning back the dog into the recess, the pin may be withdrawn in the usual manner.

It will be seen that this device is cheap and effective; that it cannot get out of order, and that there are no loose or detached portions, the loss of which would render the fastening defective. If desired, an opening may be made completely through the pin in place of a recess, and a block may be hung in this opening in such a manner that when turned down both ends will project, one beyond each edge of the pin. I however prefer the device represented and described.

I claim as my invention and desire to secure by Letters Patent—

The combination of the linchpin, its recess or opening $x$, and loose dog $b$, the whole being arranged and operating as and for the purpose set forth.

In testimony whereof I have signed my name to this specification in the presence of two subscribing witnesses.

THOMAS LALY.

Witnesses:
CHARLES E. FOSTER,
JOHN WHITE.